United States Patent [19]
Dehner

[11] 3,796,330
[45] Mar. 12, 1974

[54] VAN FOR TRANSPORTING COMPRESSIBLE MATERIAL

[76] Inventor: Charles Vincent Dehner, 6310 Aberdeen, Shawnee Mission, Kans. 66208

[22] Filed: Mar. 27, 1972

[21] Appl. No.: 238,050

[52] U.S. Cl................. 214/83.3, 214/82, 100/278
[51] Int. Cl............................................. B60p 1/00
[58] Field of Search ............. 214/83.3, 82; 100/278

[56] References Cited
UNITED STATES PATENTS

| | | | |
|---|---|---|---|
| 1,463,221 | 7/1923 | Mitchell | 100/278 |
| 3,145,647 | 8/1964 | Dinkov et al. | 100/215 X |
| 3,200,859 | 8/1964 | Parker | 100/215 X |
| 3,366,255 | 1/1968 | Evans | 214/83.3 |
| 3,656,638 | 4/1972 | Hutton et al. | 214/82 |

FOREIGN PATENTS OR APPLICATIONS 1,502,834  10/1967  France............................. 214/83.3

Primary Examiner—Gerald M. Forlenza
Assistant Examiner—R. B. Johnson
Attorney, Agent, or Firm—Schmidt, Johnson, Hovey & Williams

[57] ABSTRACT

A van for transporting compressible material such as foam rubber or products made therefrom, the van including an enclosure defining a longitudinal interior space that receives the material and a barrier mounted within the enclosure for longitudinal shifting therein to compress the material and permit larger quantities to be loaded within the van. The barrier is configured to permit loading and unloading of the material therethrough, and is also operable to hold a first load of the material in its compressed state while another load of the material is loaded and compressed to the desired state facilitating transport.

11 Claims, 4 Drawing Figures

PATENTED MAR 12 1974 3,796,330

VAN FOR TRANSPORTING COMPRESSIBLE MATERIAL

It is an important object of the present invention to provide a van for transporting compressible material such as foam rubber or products made therefrom, as well as any other comparable material or product, including an enclosure defining an interior space for receiving the material, and a barrier coupled to the enclosure for longitudinal shifting within the space to compress the material and allow the van to carry larger quantities of the material, the barrier being shiftable by drive means connected thereto.

Another object of this invention is to provide such a barrier which includes a pair of spaced members defining an opening therebetween that facilitates loading and unloading of the material through the barrier, the barrier also including removable slats extending across the opening in releasable engagement with the spaced members, the barrier further including a rigid sheet that shifts longitudinally with the members and slats while the material is being compressed, and which sheet is subsequently securable to the enclosure to hold the material in its compressed condition while the members and slats again shift longitudinally to compressibly load additional material within the van.

These and other objects and advantages of the present invention are specifically set forth in or will become apparent from the following detailed description of a preferred form of the invention when read in conjunction with the accompanying drawing wherein.

Figure 1:
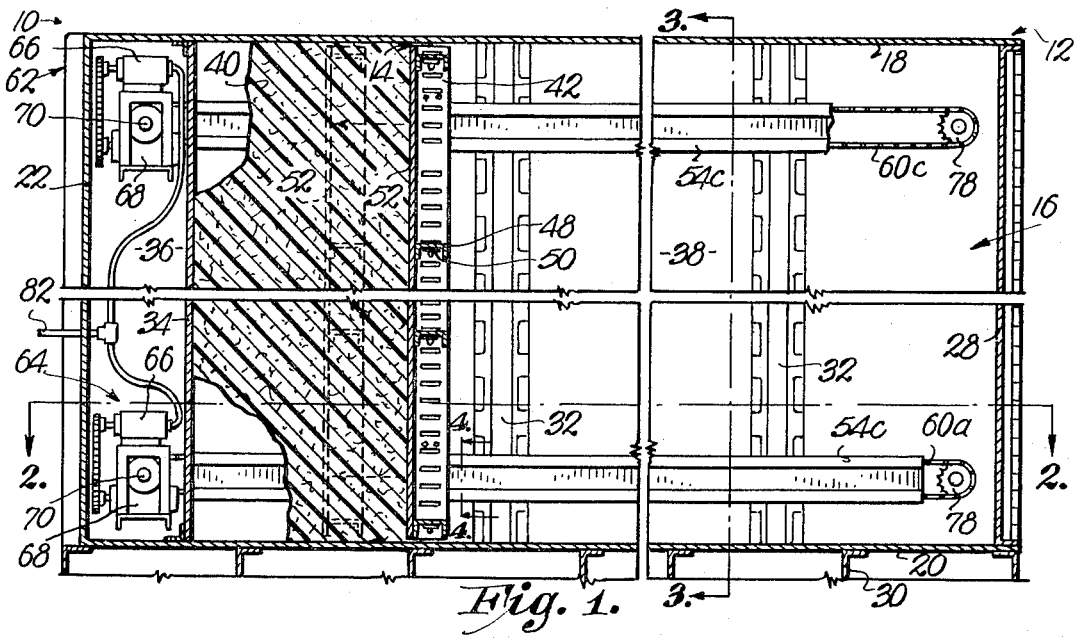
FIG. 1 is a longitudinal elevational cross-sectional view of a van constructed in accordance with the principles of this invention and filled with one load of the compressible material to be transported.

The van, generally designated by the numeral 10, includes as its major components an enclosure 12 and a barrier 14 shiftably mounted within an interior space 16 defined by enclosure 12.

Enclosure 12 is of elongated, box-like overall configuration having a roof 18, a floor 20, a permanently closed end wall 22, side walls 24 and 26, and swingable door means 28 pivotally secured to sidewalls 24 and 26. This overall construction of the enclosure 12 is similar to that of a conventional van such as the trailer of an over-the-road rig or a train car, and is conventionally constructed with various support members 30 and 32 and is normally provided with an underlying wheeled chassis, not shown.

The enclosure 12 defines the interior space 16 as of polygonal, rectangular configuration in transverse cross section. A correspondingly configured partition 34 extends transversely across space 16 to divide the latter into a forward compartment 36 and a larger compartment 38 adapted to receive the compressible material 40 to be transported by the van.

Barrier 14, disposed within compartment 38, includes a pair of upright members 42 and 44 disposed in opposite transverse sides of the interior space adjacent side walls 24 and 26 respectively. An extensive opening 46 is presented between members 42 and 44 to facilitate insertion and removal of material 40 through barrier 14. Barrier 14 also includes a plurality of transversely extending slats 48 which are releasably secured to members 42 and 44. To this end, members 42 and 44 are apertured to receive the opposite ends of slats 48 and permit the use of releasable securing means 50 for holding the slats in their assembled position illustrated extending across opening 46.

The barrier 14 further includes a removable, rigid planar sheet 52 constructed of plywood or the like. Sheet 52 is carried by, but not secured to, the members 42, 44 and slats 48. Sheet 52 is configured to permit insertion and removal thereof through opening 46 when slats 48 are moved, to the forward or leftward side of members 42 and 44 in direct engagement with material 40. Sheet 52 is, however, also complementally configured generally to the cross-sectional configuration of space 16 so as to substantially close the opening 46 when assembled as shown.

Figure 4:
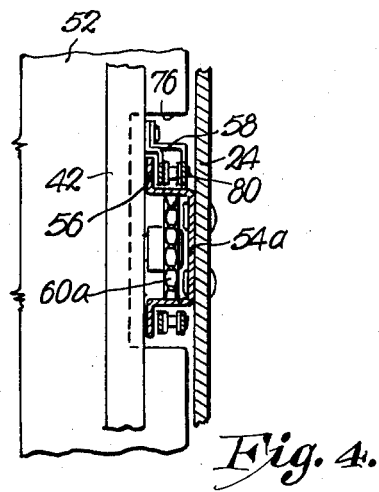
FIG. 4 is an enlarged, transverse cross-sectional view taken along line 4—4 of FIG. 1 and showing certain details of construction.

Barrier 14 is coupled to enclosure 12 for longitudinal shifting within the interior space 16 thereof. To this end the van includes four generally U-shaped, longitudinally extending guide rails 54a, b, c, d, respectively securely affixed at upper and lower positions upon the enclosure sidewalls 24 and 26 to define a lower pair of guide rails 54a, 54b and an upper pair of guide rails 54c, 54d. The guide rails are of identical construction, and each includes an upright lip 56, FIG. 4, spaced from and extending parallel to the adjacent sidewall of the enclosure. An offset link 58 is affixed upon members 42 and 44 at positions adjacent each of the guide rails and depends downwardly in interengaging relationship with the corresponding rail so as to couple the members 42 and 44 to the several guide rails. For instance, in FIG. 4 the link 58 depends downwardly to be received within the space between lip 56 and sidewall 24. This couples member 42 to enclosure 12 in a manner permitting longitudinal shifting of member 42 therewithin. The interengagement of link 58 with guide rail 54a also acts to guide member 42 to assure smooth and straight shifting of members 42, 44 in a longitudinal direction within space 16. The identical link and guide rail construction at the four spaced locations within the van act, in sum, as means coupling members 42 and 44 (and therefore the entire barrier 14) to enclosure 12 in a manner permitting longitudinal shifting of the barrier within space 16.

Drive means disposed within interior space 16 operably engages barrier 14 to shift the latter longitudinally as desired. The illustrated configuration of the drive means includes four inlets, rotary chain drives 60a, b, c, d of identical construction which are disposed in locations adjacent and corresponding to the several guide rails 54a–d to thereby present a lower pair of chain drives 60a, 60b, that extend longitudinally along the corresponding sidewalls 24, 26, and a similarly disposed upper pair of chain drives 60c–60d. The drive means further includes identically constructed upper and lower rotary actuators 62 and 64 disposed within compartment 36. Each actuator includes a rotary hydraulic motor 66 coupled to a gear reduction unit 68 to rotate oppositely extending output shafts 70 and 72 that extend transversely across compartment 36. Cog-type drive pulleys 74 are carried at the outer ends of each of shafts 70 and 72 in corresponding alignment with the four rotary chain drives 60a–d.

Each of the chain drives 60a–d extends through a corresponding notch 76 in sheet 52 and a similar output in partition 34, and each chain drive has one end thereof looped around in drive engagement with the corresponding drive pulley 74, and has its other end carried by a corresponding cog-like idler pulley 78 rotatably mounted upon the corresponding sidewalls of the enclosure near the rearward end thereof. It will be appreciated, therefore, that the upper rotary actuator 62 acts to drive the upper pair of chain drives 60c, 60d in synchronization, while the lower actuator 64 similarly synchronously drives the lower pair of chain drives 60a, 60b.

Each of the chain drives 60a–d has one of its cross shafts 80 secured in driving relationship with the corresponding link 58. In this manner each of the chain drives is interconnected with the corresponding member 42 or 44. Thus, the drive means operably, drivingly engages the carrier 14.

For operation and control of the hydraulic motor 66 of the two rotary actuators 62 and 64, there will normally be provided a prime power source such as an internal combustion engine (not shown) located outside enclosure 12. A hydraulic pump is driven by this power source to deliver motive fluid flow through conduit 82 to the hydraulic motors 66 to actuate the latter. As necessary, various hydraulic circuitry and controls are included to control and direct motive fluid flow to and from the hydraulic motors 66 to actuate the latter in synchronization. While such a hydraulic drive has been found in one instance to be highly convenient and useful since an efficient, internal combustion engine may be utilized as a prime source of power while still being disposed outside enclosure 12 to prevent contamination within space 16, it will be appreciated that various other arrangements may be utilized to effect synchronous actuation of the four rotary chain drives 60a–60d.

Loading of van 10 with compressible material 40 is accomplished with the barrier 14 rotated rightwardly from the position illustrated in the various figures, and adjacent the swingable doors 28, with transverse slats 48 removed from members 42 and 44, and with sheet 52 removed. A first load of compressible material 40 can then be carried through the opened doors 28 and cleared opening 46 to be packed at the forward end of compartment 38 adjacent partition 34. The amount of space taken up by material 40 when loaded into enclosure 12 in its expanded condition will, of course, depend on the size and configuration of the material or products to be transported.

After completion of loading of the material 40 in its expanded condition, sheet 52 is inserted through cleared opening 46 and disposed uprightly into the position illustrated at the rearward end of the material 40. Transverse slats 48 are inserted and secured to members 42 and 44.

Figure 2:
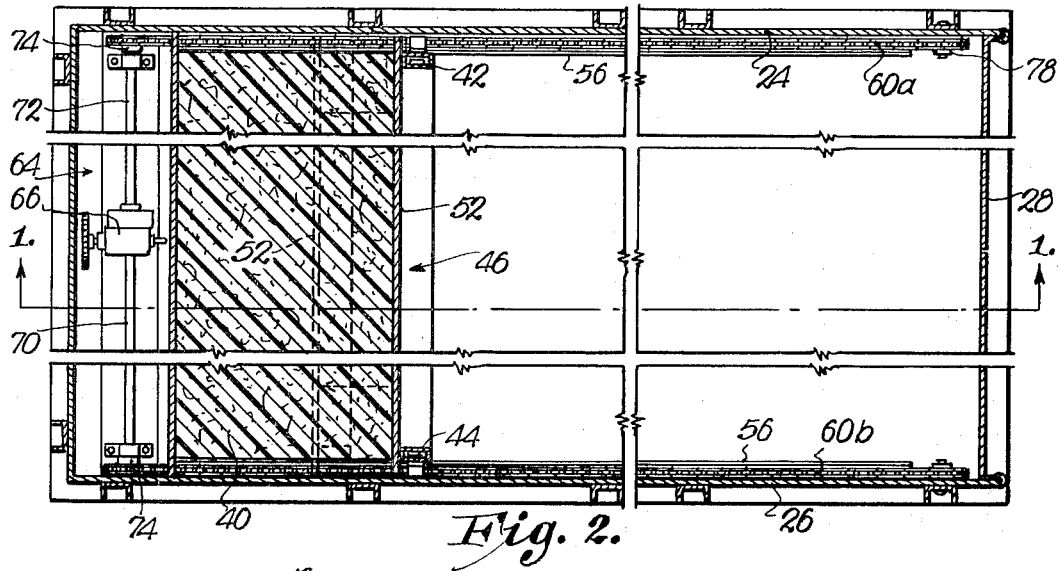
FIG. 2 is a plan cross-sectional view taken along line 2—2 of FIG. 1.
Figure 3:
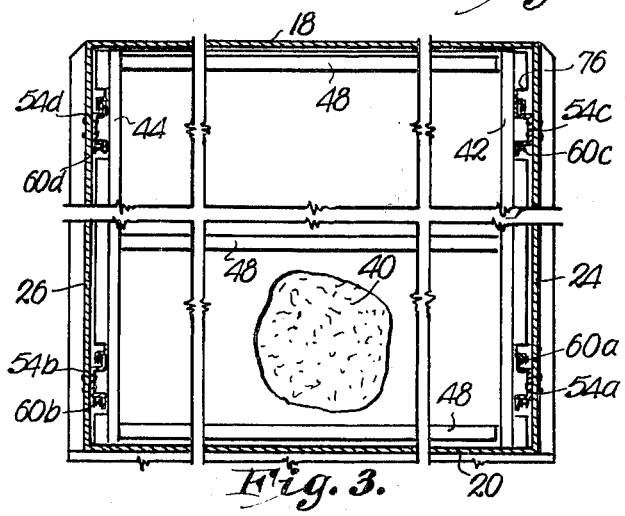
FIG. 3 is a transverse cross-sectional view taken along line 3—3 of FIG. 1.

Compression of the material 40 is next accomplished by actuating the rotary actuators 62 and 64 to set the rotary chain drives 60a–60d in motion. Acting through links 58, the chain drives shift the members 42 and 44 and transverse slats 48 synchronously leftwardly with respect to FIGS. 1 and 2 until sheet 52 is engaged thereby. Actuation of the chain drives continues with the entire barrier 14 shifting leftwardly toward the position illustrated in phantom in FIGS. 1 and 2 to compress material 14 the desired amount. material 14 the desired amount.

After completion of compression of material 40, the planar sheet 52 is secured by appropriate means, such as belts (not shown) extending transversely across space 16 in secured relationship to upright support members 32 on either side of walls 24 and 26. Such selective securement of sheet 52 holds the latter at the stationary location illustrated in phantom in the drawings and thereby holds the material 40 in its compressed state.

The actuators 62 and 64 are next reversely driven so as to shift the members 42, 44 and transverse slats 48 back rightwardly away from the material. Upon subsequent removal of transverse slats 48, the arrangement is prepared to receive additional material in the same manner as set forth above. Specifically, another load of compressible material 40 may be packed through cleared opening 46 to the forward end of compartment 38 and adjacent, this time, to the planar sheet 52 which is being held in a stationary location therewithin. A second planar sheet 52 is then inserted to the rear side of the second load of material, slats 48 are reinserted, and the drive means are again operated to shift barrier 14 longitudinally and effect compression of this second load of material, after which the second rigid sheet can be secured to the enclosure 12. This process can be repeated as many times as necessary to fill van 10 with the desired quantity of material.

It will be readily appreciated that a van 10 such as illustrated may be utilized to transport foam material in the form of "buns" or products made therefrom such as mattresses, weighing on the average of 1.2 pounds per cubic foot, the lightness thereof precluding any overloading of the van. Once the van has been filled with several loadings of the material and each loading has been compressed, the van is then transported to a point of destination whereupon each loading of the material may be released from its compressed condition sequentially and the van unloaded through doors 28. Each load of the material is, of course, released upon removing the associated sheet 52 from securement with enclosure 12.

Accordingly, without incurring any overweight problems, substantially greater volumes of compressible material may be transported than would be possible with a conventional van. For instance, if the material or product being transported is capable of being compressed to one-third its original size without permanent deformation, the van of the present invention can accommodate three times as much material than would otherwise be possible. Such transportation of compressible material substantially reduces the freight costs and handling costs usually associated therewith.

The positioning and configuration of the several guide rails 54A–d, and chain drives 60a–d at the opposite sides of the interior space 16 present essentially no interference with the availability of space 16 for receiving the material to be transported. The present invention presents an overall van construction of economical configuration of such a type permitting existing vans to easily be modified to incorporate the present invention. The utilization of links 58 both to couple the barrier 14 in shiftable relationship within enclosure 12, as well as interconnecting of the barrier 14 with the chain drives further simplifies the overall construction and adds to its economy.

Having thus described the invention, what is claimed as new and desired to be secured by Letters Patent is:

1. A van for transporting collapsible material comprising:
an enclosure defining a longitudinally extending interior space adapted to receive the material;
a barrier disposed within said space substantially spanning the latter in a transverse direction;
means coupling said barrier to said enclosure for longitudinal shifting of the barrier within said space; and
drive means operably engaging said barrier for shifting the latter longitudinally,
said barrier including a pair of members disposed at opposite transverse sides of said space,
said members defining an opening therebetween permitting insertion of the material through said barrier,
said drive means operably engaging said members to shift the latter synchronously,
said barrier further including a plurality of slats extending across said opening in removable securement with both of said members,
said slats being removable from said members to clear said opening,
said space being of polygonal configuration in transverse cross section,
said barrier further including a removable, rigid, planar sheet complementally configured to said cross section configuration of said space,
said sheet being in contact with said members and said slats for shifting longitudinally therewith within said space.

2. A van for transporting collapsible material as set forth in claim 1, said sheet being selectively securable to said enclosure whereby to remain at a stationary location within said space upon securement to said enclosure while said members shift longitudinally.

3. A van for transporting collapsible material comprising:
an enclosure defining a longitudinally extending interior space adapted to receive the material;
a barrier disposed within said space substantially spanning the latter in a transverse direction;
means coupling said barrier to said enclosure for longitudinal shifting of the barrier within said space; and
drive means operably engaging said barrier for shifting the latter longitudinally,
said barrier including a pair of members disposed at opposite transverse sides of said space,
said members defining an opening therebetween permitting insertion of the material through said barrier,
said drive means operably engaging said members to shift the latter synchronously,
said drive means including at least one pair of endless, rotary chain drives, respectively disposed adjacent and operably coupled with a corresponding one of said members and extending longitudinally along a corresponding one of said opposite sides of the space,
said drive means further including a rotary actuator in said enclosure operably coupled with said pair of chain drives for rotating the latter synchronously to shift said barrier longitudinally,
said drive means including a second pair of said chain drives spaced from the first pair and respectively operably coupled to said corresponding members,
said drive means further including a second rotary actuator in said enclosure operably coupled with said second pair of chain drives for rotating the latter synchronously to shift said barrier longitudinally,
there being a stationary partition within said space dividing the latter into first and second compartments, said rotary actuators being disposed in the first compartment, and said barrier being disposed in the second compartment.

4. A van for transporting collapsible material comprising:
an enclosure defining a longitudinally extending interior space adapted to receive the material;
a barrier disposed within said space substantially spanning the latter in a transverse direction;
means coupling said barrier to said enclosure for longitudinal shifting of the barrier within said space; and
drive means operably engaging said barrier for shifting the latter longitudinally,
said barrier including a pair of members disposed at opposite transverse sides of said space,
said members defining an opening therebetween permitting insertion of the material through said barrier,
said drive means operably engaging said members to shift the latter synchronously,
said drive means including at least one pair of endless, rotary chain drives, respectively disposed adjacent and operably coupled with a corresponding one of said members and extending longitudinally along a corresponding one of said opposite sides of the space,
said drive means further including a rotary actuator in said enclosure operably coupled with said pair of chain drives for rotating the latter synchronously to shift said barrier longitudinally,
said coupling means including a longitudinal guide rail secured to said enclosure at each of said opposite sides of the space, and links secured to said members and disposed in interengaging relationship with the corresponding rail for coupling said members to the respective rail and guiding said members as they shift longitudinally.

5. A van as set forth in claim 4, said links being secured to the corresponding one of said pair of chain drives to interconnect said drive means and said barrier.

6. A van for transporting collapsible material comprising:
an enclosure defining a longitudinally extending interior space adapted to receive the material;
a barrier disposed within said space substantially spanning the latter in a transverse direction;
means coupling said barrier to said enclosure for longitudinal shifting of the barrier within said space to compress said material;
drive means operably engaging said barrier for selectively shifting the latter longitudinally,
said barrier including a pair of units;
a first one of said units being adapted for reciprocable shifting within said space and a second one of said units being selectively separable from said first unit after the barrier has been shifted in a direction to effect said compression of the material; and means for securing said second unit to said enclosure in a stationary location within said space when said first unit is shifted in an opposite direction away from said material whereby the latter is held in said compression by said second unit.

7. A van for transporting collapsible material as set forth in claim 6, wherein said first unit includes a pair of frame members disposed at opposite transverse sides of said space, said members defining an opening therebetween permitting insertion of the material through said barrier.

8. A van for transporting collapsible material as set forth in claim 7, wherein said second unit is in a position extending across said opening when the barrier is shifted in said compression direction.

9. A van for transporting collapsible material comprising:
- an enclosure having a top wall, bottom wall, opposed side walls and a stationary end wall to define a longitudinally extending interior space adapted to receive the material;
- a barrier disposed within said space substantially spanning the latter in a transverse direction;
- means coupling said barrier to said enclosure for reciprocable, longitudinal shifting of the barrier within said space toward and away from said end wall; and
- drive means operably engaging said barrier for shifting the latter longitudinally,
- said barrier including a pair of frame members disposed adjacent said side walls at opposite transverse sides of said space to define an opening therebetween permitting insertion of the material through said barrier,
- said drive means operably engaging said members to shift the latter synchronously in a direction toward said end wall when said material is to be compressed,
- said barrier further including structure extending across said opening and shiftable relative to said members to clear said opening,
- said structure having at least one removable portion securable to said enclosure when said barrier has been shifted toward said end wall to compress said material, for retaining said material in a compressed condition when said barrier is shifted in an opposite direction away from said end wall.

10. A van for transporting collapsible material as set forth in claim 9, wherein said structure includes a plurality of slats extending across said opening.

11. A van for transporting collapsible material comprising:
- an enclosure defining a longitudinally extending interior space adapted to receive the material;
- a barrier disposed within said space substantially spanning the latter in a transverse direction;
- means coupling said barrier to said enclosure for longitudinal shifting of the barrier within said space; and
- drive means operably engaging said barrier for shifting the latter longitudinally,
- said barrier including a pair of members disposed at opposite transverse sides of said space,
- said members defining an opening therebetween permitting insertion of the material through said barrier,
- said drive means operably engaging said members to shift the latter synchronously,
- said drive means including at least one pair of endless, rotary chain drives, respectively disposed adjacent and operably coupled with a corresponding one of said members and extending longitudinally along a corresponding one of said opposite sides of the space,
- said drive means further including a rotary actuator in said enclosure operably coupled with said pair of chain drives for rotating the latter synchronously to shift said barrier longitudinally,
- there being a stationary partition within said space dividing the latter into first and second compartments, said rotary actuator being disposed in the first compartment, and said barrier being disposed in the second compartment.

* * * * *